US011770722B2

(12) United States Patent
Kolding et al.

(10) Patent No.: US 11,770,722 B2
(45) Date of Patent: Sep. 26, 2023

(54) SIGNALLING OF DETERMINISTIC SYSTEM CAPABILITIES DEPENDING ON ABSOLUTE TRANSMISSION TIME (TSN, DETNET, ETC.)

(71) Applicant: Nokia Technologies Oy, Espoo (FI)

(72) Inventors: Troels E. Kolding, Klarup (DK);
Daniela Laselva, Klarup (DK);
Guillermo Pocovi, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 138 days.

(21) Appl. No.: 17/267,973

(22) PCT Filed: Aug. 13, 2019

(86) PCT No.: PCT/US2019/046262
§ 371 (c)(1),
(2) Date: Feb. 11, 2021

(87) PCT Pub. No.: WO2020/036911
PCT Pub. Date: Feb. 20, 2020

(65) Prior Publication Data
US 2021/0250787 A1 Aug. 12, 2021

Related U.S. Application Data

(60) Provisional application No. 62/718,420, filed on Aug. 14, 2018.

(51) Int. Cl.
*H04W 24/02* (2009.01)
*H04L 47/2491* (2022.01)
(Continued)

(52) U.S. Cl.
CPC ......... *H04W 24/02* (2013.01); *H04L 47/2491* (2013.01); *H04L 47/283* (2013.01); *H04W 28/10* (2013.01)

(58) Field of Classification Search
None
See application file for complete search history.

(56) References Cited

U.S. PATENT DOCUMENTS

| 6,845,100 B1 * | 1/2005 | Rinne | H04W 8/04 |
| | | | 370/395.43 |
| 2017/0079059 A1 * | 3/2017 | Li | H04W 16/02 |

(Continued)

OTHER PUBLICATIONS

Oh, Sung-Min, et al., "End-to-End QoS Guaranteed Service in WLAN and 3GPP Interworking Network", Jan. 1, 2006, Management of Convergence Networks and Services Lecture Notes in Computer Science, 11 pgs.

(Continued)

*Primary Examiner* — Eunsook Choi
(74) *Attorney, Agent, or Firm* — Harrington & Smith

(57) ABSTRACT

A method and apparatus to perform communicating with a network device in a communication network by another network device, information including characteristics of a 3 GPP system network associated with the another network device; based at least on the information, determining scheduling information for communication by at least one network node in the 3 GPP system network; and sending the scheduling information for the communication in the 3 GPP system network. Further, to perform communicating with a network device in a communication network by another network device information including characteristics of an 3 GPP system network associated with the another network device; and based on the characteristics, communicating with the network device to identify at least one interval of time to achieve a specific deterministic latency for a communication in the 3 GPP system network by at least one network node.

18 Claims, 6 Drawing Sheets

(51) Int. Cl.
*H04L 47/283* (2022.01)
*H04W 28/10* (2009.01)
*H04L 12/857* (2013.01)

(56) References Cited

U.S. PATENT DOCUMENTS

2017/0289851 A1\* 10/2017 Majmundar ............ H04L 47/29
2018/0262924 A1\* 9/2018 Dao ...................... H04W 24/08
2018/0316799 A1\* 11/2018 Shaw .................. H04L 41/0806
2020/0252813 A1\* 8/2020 Li ........................ G06Q 20/382

OTHER PUBLICATIONS

Naumann, Arne, et al., "Towards integration of Industrial Ethernet with 5G mobile networks", 2018 14$^{th}$ IEEE International Workshop on factory Communication Systems, abstract only, 1 pg.

\* cited by examiner

SIGNALLING OF DETERMINISTIC SYSTEM CAPABILITIES DEPENDING ON ABSOLUTE TRANSMISSION TIME (TSN, DETNET, ETC.)

CROSS REFERENCE TO RELATED APPLICATION

This patent application is a U.S. National Stage application of International Patent Application Number PCT/US2019/046262 filed Aug. 13, 2019, which is hereby incorporated by reference in its entirety, and claims priority to U.S. provisional application 62/718,420 filed Aug. 14, 2018, which is hereby incorporated by reference in its entirety.

TECHNICAL FIELD

The teachings in accordance with the exemplary embodiments of this invention relate generally to addressing various challenges of supporting deterministic and time-sensitive services (TSN, and/or DetNet as non-limiting examples) over wireless communications (e.g., with focus on 5G). In particularly, the exemplary embodiments of this invention relate to the integration of the 5GS with external (or potentially internal) network controller entities (e.g., CNC in TSN domain) to provide more flexibility and improved performance.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
  5GS 5G system
  AF application function
  AMF access and mobility function
  CNC centralized network controller
  CoMP coordination multipoint communication
  CUC centralized user configuration
  DetNet deterministic network
  DN data network
  E2E end-to-end
  IETF Internet engineering task force
  TDD time division duplex
  MS millisecond
  ND network device
  NEF network exposure function
  PCF policy control function
  SMF session management function
  TSN time sensitive networking
  UPF user plane function
  URLLC ultra-reliable low latency communications Time sensitive networking (TSN) standards may be used by communication networks with focus on improving latency and reliability of data flows. In accordance with an example embodiment of the invention, a Release 16 architecture can be used to support Time Sensitive Networking (TSN) with a 5GS network, where the 5GS network must operate according to a guaranteed and promised performance in terms of guaranteed latency and delay variations of the user plane. The novel operations herein further address issues in wireless systems as compared to wired systems. The issue addressed includes that wireless systems experience a performance that varies with time and no mechanisms exist to report inherent time-dependencies to an external (or internal) control system.

However, presently in TSN systems a fixed supported delay is reported to the controller (e.g., TSN CNC). In 3GPP there are no mechanisms in place to report inherent deterministic capabilities to an external (or internal) control system that links to the specifics of an application.

Example embodiments of the invention work to address at least these issues of TSN system implementation in communication networks.

SUMMARY

This section contains examples of possible implementations and is not meant to be limiting.

In one exemplary embodiment, a method comprises communicating with a network device in a communication network by another network device, information comprising characteristics of a 3GPP system network associated with the another network device; and based at least on the information, determining scheduling information for communication by at least one network node in the 3GPP system network; then as shown in step 530 of FIG. 5A there is sending the scheduling information for the communication in the 3GPP system network.

A further exemplary embodiment is a method comprising the method of the previous paragraph, wherein the 3GPP system network comprises a 5GS network, and wherein the another network device comprises a 5GS server, wherein the characteristics are communicated as a function of application data generated/received by the another network device, wherein the another network device comprises a 3GPP time sensitive networking bridge, wherein the communicating comprises communicating between the 3GPP time sensitive networking bridge and the 3GPP 5GS network a function of characteristics of data flows to serve for the communication, wherein the information comprise data flow parameters including an arrival time and a periodic cycle of data flows associated with the 3GPP 5GS network, wherein the communicating comprises communicating between the 3GPP 5GS network and the 3GPP time sensitive networking bridge deterministic capabilities in terms of e.g., user-plane and/or control-plane delays, jitter, and reliability, as a function of the data flow parameters, wherein the communicating causes the 3GPP time sensitive networking bridge to makes or adjust scheduling decisions, in terms of at least a data flow periodicity, and transmit window timing, based on the information from the 3GPP 5GS network in order to optimize performance of at least one E2E data flow of the communication, wherein the communicating is performed over an N5 interface, wherein the characteristics are based on specific windows of time, wherein the specific windows of time are based on at least one of data flow periodicity, transmit widow timing, cycles of transmit window timing, wherein the characteristics comprise indications of at least one of an availability of guaranteed latency, a minimum guaranteed latency, and a maximum guaranteed latency of communications in the 5GS network for at least one interval of time, wherein there is, based on the characteristics, at least one of determining and adjusting the scheduling information to at least optimize performance of data flow for the communication, wherein the indications are for different time periods within the at least one interval of time, wherein the communicating comprises communications to determine, based on the characteristics for the at least one interval of time, how to achieve a specific deterministic latency during the at least one interval of time, wherein the communications to determine how to achieve a specific deterministic latency for the communication during the at least one interval of time, comprises communications to determine how to achieve a specific deterministic latency during a time period within the at least one interval of time, wherein the communicating comprises communication rules for achieving a best minimum guaranteed latency for the at least one interval of time, wherein the rules for achieving the best minimum guaranteed latency comprises a time variance expected for the at least one interval of time, wherein the rules for achieving the best minimum guaranteed latency comprises an indication of at least one integer range of indices of a payload for the communication during the at least one interval of time, and/or wherein the characteristics are based on the at least one integer range of indices.

In another exemplary embodiment, there is an apparatus, comprising: means for communicating with a network device in a communication network by another network device, information comprising characteristics of a 3GPP system network associated with the another network device; and means, based at least on the information, for determining scheduling information for communication by at least one network node in the 3GPP system network; then as shown in step 530 of FIG. 5A there is sending the scheduling information for the communication in the 3GPP system network.

A further exemplary embodiment is an apparatus comprising the apparatus of the previous paragraph, wherein the 3GPP system network comprises a 5GS network, and wherein the another network device comprises a 5GS server, wherein the characteristics are communicated as a function of application data generated/received by the another network device, wherein the another network device comprises a 3GPP time sensitive networking bridge, wherein the communicating comprises communicating between the 3GPP time sensitive networking bridge and the 3GPP 5GS network a function of characteristics of data flows to serve for the communication, wherein the information comprise data flow parameters including an arrival time and a periodic cycle of data flows associated with the 3GPP 5GS network, wherein the communicating comprises communicating between the 3GPP 5GS network and the 3GPP time sensitive networking bridge deterministic capabilities in terms of e.g., user-plane and/or control-plane delays, jitter, and reliability, as a function of the data flow parameters, wherein the communicating causes the 3GPP time sensitive networking bridge to makes or adjust scheduling decisions, in terms of at least a data flow periodicity, and transmit window timing, based on the information from the 3GPP 5GS network in order to optimize performance of at least one E2E data flow of the communication, wherein the communicating is performed over an N5 interface, wherein the characteristics are based on specific windows of time, wherein the specific windows of time are based on at least one of data flow periodicity, transmit widow timing, cycles of transmit window timing, wherein the characteristics comprise indications of at least one of an availability of guaranteed latency, a minimum guaranteed latency, and a maximum guaranteed latency of communications in the 5GS network for at least one interval of time, wherein there are means, based on the characteristics, for at least one of determining and adjusting the scheduling information to at least optimize performance of data flow for the communication, wherein the indications are for different time periods within the at least one interval of time, wherein the communicating comprises communications to determine, based on the characteristics for the at least one interval of time, how to achieve a specific deterministic latency during the at least one interval of time, wherein the communications to determine how to achieve a specific deterministic latency for the communication during the at least one interval of time, comprises communications to determine how to achieve a specific deterministic latency during a time period within the at least one interval of time, wherein the communicating comprises communication rules for achieving a best minimum guaranteed latency for the at least one interval of time, wherein the rules for achieving the best minimum guaranteed latency comprises a time variance expected for the at least one interval of time, wherein the rules for achieving the best minimum guaranteed latency comprises an indication of at least one integer range of indices of a payload for the communication during the at least one interval of time, and/or wherein the characteristics are based on the at least one integer range of indices.

In a further exemplary embodiment, an apparatus comprises one or more processors and one or more memories including computer program code. The one or more memories and the computer program code configured, with the one or more processors, to cause the apparatus to perform at least the following: communicating with a network device in a communication network by another network device, information comprising characteristics of a 3GPP system network associated with the another network device; and based at least on the information, determining scheduling information for communication by at least one network node in the 3GPP system network; then as shown in step 530 of FIG. 5A there is sending the scheduling information for the communication in the 3GPP system network.

Another exemplary embodiment comprises a computer program comprising code for communicating with a network device in a communication network by another network device, information comprising characteristics of a 3GPP system network associated with the another network device; and based at least on the information, determining scheduling information for communication by at least one network node in the 3GPP system network; then as shown in step 530 of FIG. 5A there is sending the scheduling information for the communication in the 3GPP system network.

In still another exemplary embodiment, a method comprises communicating with a network device in a communication network by another network device information comprising characteristics of an 3GPP system network associated with the another network device; and based on the characteristics, communicating with the network device to identify at least one interval of time to achieve a specific deterministic latency for a communication in the 3GPP system network by at least one network node.

A further exemplary embodiment is a method comprising the method of the previous paragraph, wherein the 3GPP system network comprises a 5GS network, and wherein the network device comprises an application function server, wherein the network device comprises a 3GPP 5GS network device wherein the another network device comprises a 3GPP time sensitive networking bridge, wherein the communicating comprises communicating between the 3GPP time sensitive networking bridge and the 3GPP 5GS network device a function of characteristics of data flows to serve for the communication, wherein the information comprise data flow parameters including an arrival time and a periodic cycle of data flows associated with the 3GPP 5GS network device, wherein the communicating comprises communicating between the 3GPP 5GS network device and the 3GPP time sensitive networking bridge deterministic capabilities in terms of e.g., user-plane and/or control-plane delays, jitter, and reliability, as a function of the data flow parameters, wherein the communicating causes the 3GPP time sensitive networking bridge to makes or adjust scheduling decisions, in terms of at least a data flow periodicity, and transmit window timing, based on the information from the 3GPP 5GS network device in order to optimize performance of at least one E2E data flow of the communication, wherein the communicating is performed over an N5 interface, wherein the characteristics are based on specific windows of time, wherein the specific windows of time are based on at least one of data flow periodicity, transmit widow timing, cycles of transmit window timing, wherein the characteristics comprise indications of at least one of an availability of guaranteed latency, a minimum guaranteed latency, and a maximum guaranteed latency of communications in the 5GS network for at least one interval of time, wherein there is, based on the characteristics, at least one of determining and adjusting the scheduling information to at least optimize performance of data flow for the communication, wherein the indications are for different time periods within the at least one interval of time, wherein the communicating comprises communications to determine, based on the characteristics for the at least one interval of time, how to achieve a specific deterministic latency during the at least one interval of time, wherein the communications to determine how to achieve a specific deterministic latency for the communication during the at least one interval of time, comprises communications to determine how to achieve a specific deterministic latency during a time period within the at least one interval of time, wherein the communicating comprises communication rules for achieving a best minimum guaranteed latency for the at least one interval of time, wherein the rules for achieving the best minimum guaranteed latency comprises a time variance expected for the at least one interval of time, wherein the rules for achieving the best minimum guaranteed latency comprises an indication of at least one integer range of indices of a payload for the communication during the at least one interval of time, and/or wherein the characteristics are based on the at least one integer range of indices.

In yet another exemplary embodiment, there is an apparatus, comprising: means for communicating with a network device in a communication network by another network device information comprising characteristics of an 3GPP system network associated with the another network device; and means, based on the characteristics, for communicating with the network device to identify at least one interval of time to achieve a specific deterministic latency for a communication in the 3GPP system network by at least one network node.

A further exemplary embodiment is an apparatus comprising the apparatus of the previous paragraph, wherein the 3GPP system network comprises a 5GS network, and wherein the network device comprises an application function server, wherein the network device comprises a 3GPP 5GS network device wherein the another network device comprises a 3GPP time sensitive networking bridge, wherein the communicating comprises communicating between the 3GPP time sensitive networking bridge and the 3GPP 5GS network device a function of characteristics of data flows to serve for the communication, wherein the information comprise data flow parameters including an arrival time and a periodic cycle of data flows associated with the 3GPP 5GS network device, wherein the communicating comprises communicating between the 3GPP 5GS network device and the 3GPP time sensitive networking bridge deterministic capabilities in terms of e.g., user-plane and/or control-plane delays, jitter, and reliability, as a function of the data flow parameters, wherein the communicating causes the 3GPP time sensitive networking bridge to makes or adjust scheduling decisions, in terms of at least a data flow periodicity, and transmit window timing, based on the information from the 3GPP 5GS network device in order to optimize performance of at least one E2E data flow of the communication, wherein the communicating is performed over an N5 interface, wherein the characteristics are based on specific windows of time, wherein the specific windows of time are based on at least one of data flow periodicity, transmit widow timing, cycles of transmit window timing, wherein the characteristics comprise indications of at least one of an availability of guaranteed latency, a minimum guaranteed latency, and a maximum guaranteed latency of communications in the 5GS network for at least one interval of time, wherein there is means, based on the characteristics, for at least one of determining and adjusting the scheduling information to at least optimize performance of data flow for the communication, wherein the indications are for different time periods within the at least one interval of time, wherein the communicating comprises communications to determine, based on the characteristics for the at least one interval of time, how to achieve a specific deterministic latency during the at least one interval of time, wherein the communications to determine how to achieve a specific deterministic latency for the communication during the at least one interval of time, comprises communications to determine how to achieve a specific deterministic latency during a time period within the at least one interval of time, wherein the communicating comprises communication rules for achieving a best minimum guaranteed latency for the at least one interval of time, wherein the rules for achieving the best minimum guaranteed latency comprises a time variance expected for the at least one interval of time, wherein the rules for achieving the best minimum guaranteed latency comprises an indication of at least one integer range of indices of a payload for the communication during the at least one interval of time, and/or wherein the characteristics are based on the at least one integer range of indices.

In a further exemplary embodiment, an apparatus comprises one or more processors and one or more memories including computer program code. The one or more memories and the computer program code configured, with the one or more processors, to cause the apparatus to perform at least the following: communicating with a network device in a communication network by another network device information comprising characteristics of an 3GPP system network associated with the another network device; and based on the characteristics, communicating with the network device to identify at least one interval of time to achieve a specific deterministic latency for a communication in the 3GPP system network by at least one network node.

Another exemplary embodiment comprises a computer program comprising code for communicating with a network device in a communication network by another network device information comprising characteristics of an 3GPP system network associated with the another network device; and based on the characteristics, communicating with the network device to identify at least one interval of time to achieve a specific deterministic latency for a communication in the 3GPP system network by at least one network node.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1A:
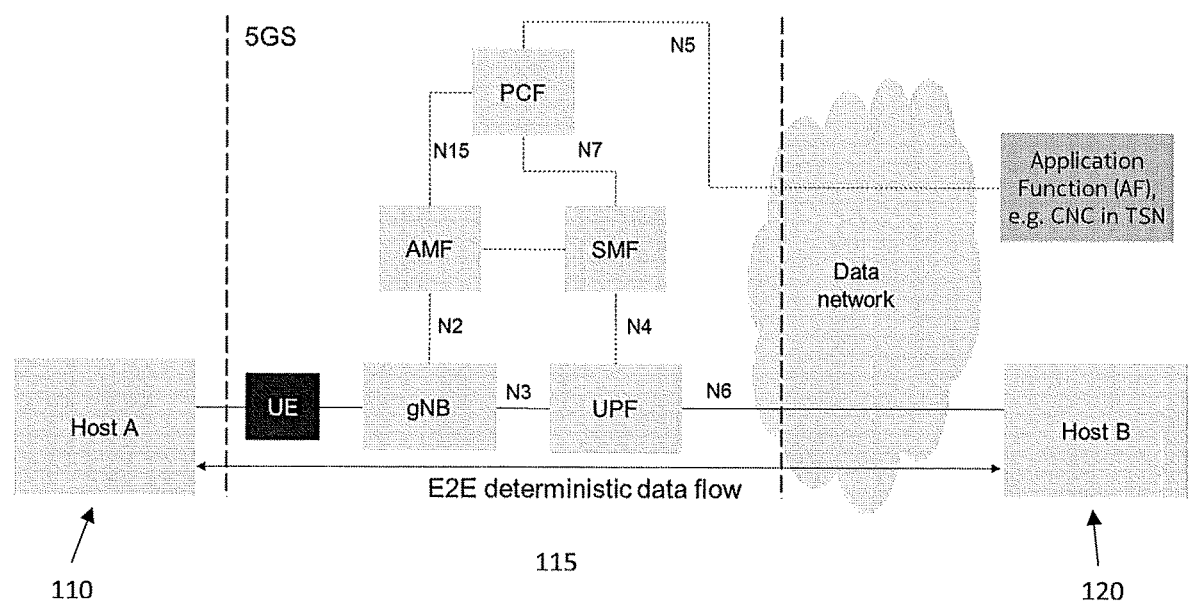
FIG. 1A shows a 5GS architecture and interworking with outside functions and end devices.

In this invention, there is proposed novel operations to improve integration of 3GPP networks into TSN (Time Sensitive Networking).

Example embodiments of the invention relate to TSN (Time Sensitive Networking), and particularly to integration of 3GPP networks into TSN. It is foreseen that (5G) 3GPP networks may build a part of an overall TSN system (most likely a TSN bridge). As TSN has strict requirements (e.g., latency, delay, jitter) the 3GPP network has to fulfill these requirements. In TSN, a controller (CNC) "checks" the available bridges with respect to the requirements. Thus, CNC may inquire the 3GPP network on its capabilities, and the 3GPP network has to respond accordingly.

In regards to the abbreviations above it is further noted: TSN flow: Term used to describe the time-critical communication between end devices. Each flow has strict time requirements that the networking devices honor. Each TSN flow is uniquely identified by the network devices:

End Devices: application that requires deterministic communication. These are also referred to as talkers and listeners.

Bridges: Also referred as Ethernet switches. For TSN, these are special bridges capable of transmitting the Ethernet frames of a TSN flow on a schedule and receiving Ethernet frames of a TSN flow according to a schedule.

Central network controller (CNC): For TSN, the CNC acts as a proxy network (the TSN bridges and their interconnections) to the applications that require deterministic communication. The CNC defines the schedule on which all TSN frames are transmitted.

Centralized user configuration (CUC): An application that communicates with the CNC and the end devices. The CUC represents the control applications and the end devices. The CUC makes requests to the CNC for deterministic communication (TSN flows) with specific requirements for those flows.

In a concept of TSN at time of this application, a TSN bridge reports its capabilities e.g., as a function of the data flow traffic characteristics, e.g., the TSN bridge reports delay(s) the network can support as a function of a payload size. However, this may not be optimal if the TSN bridge is indeed a 3GPP network. The performance of the 3GPP networks are, in contrast to conventional TSN bridges, time-dependent. In other words, 3GPP network capabilities may dynamically change over time, e.g., second or milliseconds and/or fractions of seconds or milliseconds Example embodiments of the invention as described herein at least provide a specific extension to the current TSN concept that takes care that wireless systems (as opposed to normal DetNet/TSN bridges) are time-varying in nature, e.g., for TDD systems and other systems there is a varying achievable user plane delay versus time. The new proposal is to make the reported delay have a time-line associated with it, e.g., a "window of opportunity" that the application must adhere in order to get a certain performance level.

In other words, the CNC would inquire the 3GPP network for its capabilities and the 3GPP network would respond in a way to inform TSN (or any other external system) of what performance is available at which time windows. The TSN system could react accordingly e.g., to optimize its scheduling operations.

3GPP Release 16 has been envisioned to bring deterministic networking capabilities. Concretely, it is a goal in Release 16 to support Time Sensitive Networks (TSN, an IEEE standard), where the 5GS can act as a link or a bridge that operates according to guaranteed and promised capabilities in terms of guaranteed latency and delay variations of the user plane (see SA SID, SP-180507).

In TSN context, that means that 5GS needs to comply with E2E strict latency and jitter, all the way from the N6 interface (between UPF and the connected DN) to the UE. As shown in FIG. 1 there is a Host A 110 which is communicating a E2E deterministic data flow information 115 with a Host B 120.

Accurate synchronization as well as common understanding of a global time are key enablers that are intended to be provided also in Release 16 (part of Enhanced URLLC Study Item, see RAN SID RP-181477). Furthermore, the network needs to be able to "promise" certain performance levels to an outside system (e.g., the Centralized Network Controller, CNC, network element in the TSN context) so that this CNC can optimize the complete system of which 5GS is a sub-set. As an alternative to centralized control via CNC, also distributed methods exist but the same principle applies. The 5GS needs to be able to predict its capabilities based on its network configuration (number of antennas, FDD/TDD, possibility for multi-connectivity or CoMP, the UE capability class, etc.) and then "promise" such a performance level to the outside world (CNC or neighbour network element, e.g., a TSN bridge). After its capabilities have been promised to the external system, the deterministic traffic flows and schedules are being calculated and the 5GS may then receive general or detailed knowledge related to the deterministic traffic it needs to serve (e.g., via communication over the N5 interface from AF to the PCF).

The time-schedules for handling data/control traffic in TSN are short. For example 5G TSN is specified to be able to support messages with periodicities down to 0.5 ms with low jitter (in the order of us); see e.g., TR22.261 and TR22.804 in 3GPP. Those requirements can only be met using specific configuration of the RAN and the core, where these dedicated configurations would be applied only for some traffic types. As example, consider the delay of packets coming into a 5GS TDD system configured for 40% uplink resources. Similar dependencies may exist in other places in the 5GS outside the RAN.

Figure 1B:
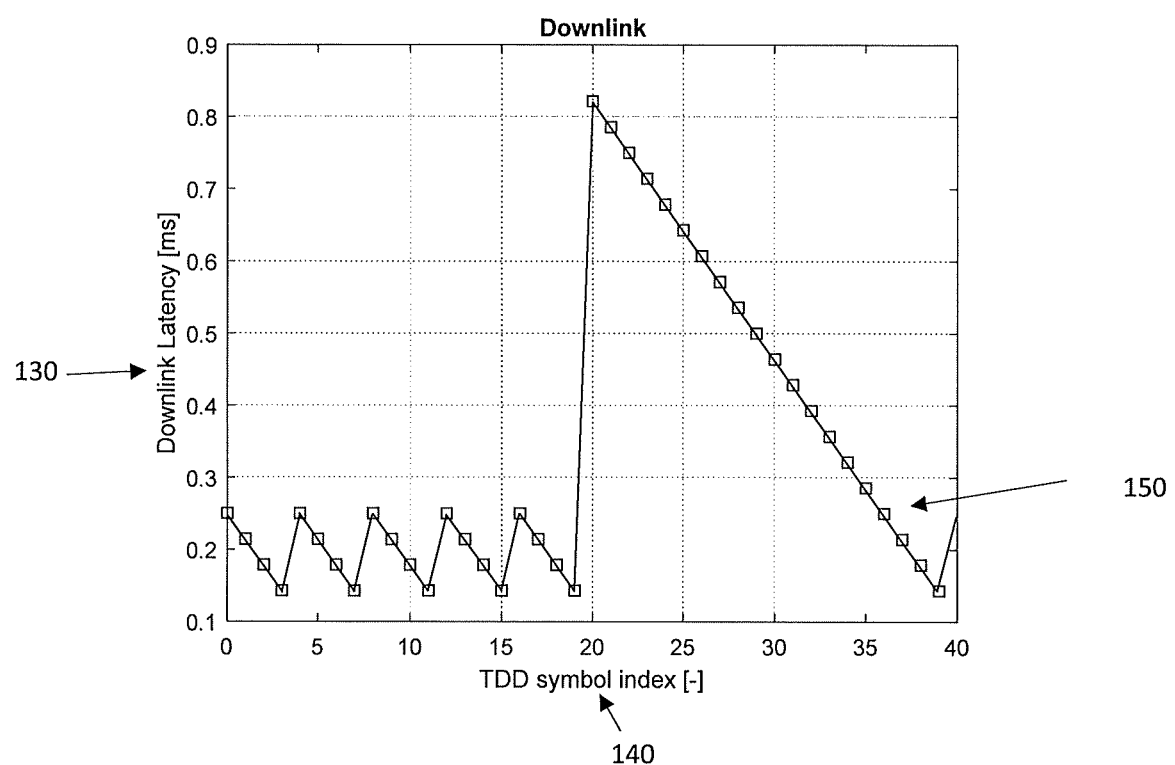
FIG. 1B shows a minimum latency that a downlink message will experience depending on when it enters the buffer of a 5GS.

FIG. 1B shows the minimum latency that a downlink message will experience depending on when it enters the buffer of the 5GS as a function of TDD symbol index resolution. As shown in FIG. 1B there is a graph which identifies a downlink latency 130 of a message in ms at each TDD symbol index 140. This is shown in FIG. 1B by the graph points 150. Note that the message may arrive at any time with ns resolution as it comes from high speed Ethernet system. TDD is defined in NR Rel-15 with a subframe structure which offers a good UL-DL scalability (TS 38211).

Here, a few observations can be made:
  If the arrival cycle of the message corresponds to a full frame (40 TDD symbols or integer multiple) there is a consistent delay that varies with the offset of data arrival (to the start of the frame, and also referenced to a global absolute time known to all systems). For example, if there is support of an absolute delay <0.5 ms (as a guaranteed or promise), it may only be achieved if the traffic comes in a certain way. Otherwise, the system may only guarantee 0.85 ms (i.e. worst case delay); and
  If the arrival cycle of the messages is not consistent with a full frame (e.g., each message has different offset) then there can be a certain amount of jitter which can then be compensated by always postponing (holding) data until the worst-case delay, e.g., the 0.85 ms delay.

It is clear from at least the example as disclosed herein, that there can be a large delta between the optimal delay and the worst-case delay. Similar examples could be made for other network parameters. Today there is no way to expose such time dependence of delay between a networking/forwarding element and its control system. In e.g., TSN the delay reported is expected to be fixed and therefore predictable (the IEEE P802.1Qcc standard, part of TSN family, specifies an independent and a dependent delay component, where the dependent delay component only takes into account the frame size). If the worst-case performance is reported (e.g., 0.85 ms as in FIG. 1B), the system performance will be sub-optimal and some use-cases might not be supported with e.g., the 5G technology.

Figure 2:
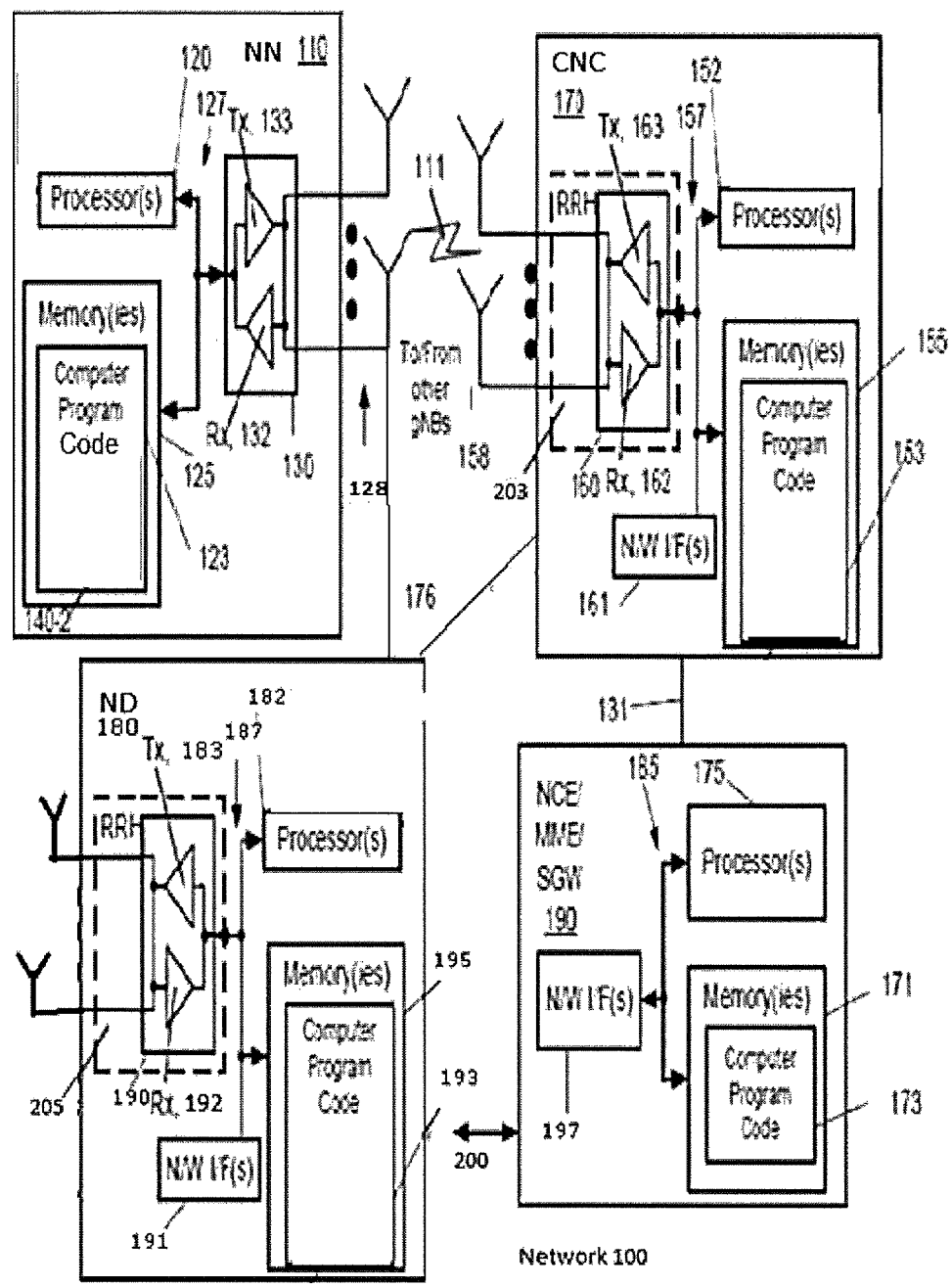
FIG. 2 shows a high level block diagram of various devices used in carrying out various aspects of the invention.

Before describing the example embodiments of the invention in further detail, reference is made to FIG. 2 for illustrating a simplified block diagram of various electronic devices that are suitable for use in practicing the example embodiments of this invention. FIG. 2 shows a block diagram of one possible and non-limiting exemplary system in which the example embodiments of the invention may be practiced. In FIG. 2, a network node (NN) 110 is in wireless, communication with a wireless network 100. A NN is a wireless, typically mobile device or user equipment that can access a wireless network. The NN 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more transceivers 130 have multi-connectivity configurations and communicate over the wireless network 100 or any other network. The one or more memories 125 include computer program code 123 executed by the one or more processors 120. The one or more processors 120 may be implemented also as an integrated circuit or through other hardware such as a programmable gate array. For instance, the one or more memories 125 and the computer program code 123 may be configured, with the one or more processors 120, to cause the NN 110 to perform one or more of the operations as described herein. The NN 110 communicates with a centralized network controller (CNC) 170 via a wireless link 111.

The CNC 170 is centralized network controller (CNC) and/or a DetNet/TSN bridge which can be associated with an application function server which can relate to a TSN and which may be incorporated into a network device (e.g., a NR/5G/5GS Node B (NB) or possibly an evolved NB, and/or a server) that communicates with devices such as ND 180 and NN 110 of FIG. 2. The CNC 170 may be a stand alone device or may be incorporated into a network device which provides access to wireless devices such as the NN 110 to the wireless network 100. The CNC 170 includes one or more processors 152, one or more memories 155, one or more network interfaces (N/W I/F(s)) 161, and if the application server CNC 170 is incorporated into a network device there would be the available to the CNC 170 the one or more transceivers 160 interconnected through one or more buses 157. The including of these transceivers and related wireless communication components in the CNC 170 as in FIG. 2 are non-limiting and the CNC 170 may operate without any or all of these components. Each of the one or more transceivers 160 including a receiver Rx 162 and a transmitter Tx 163. The one or more transceivers 160 are connected to one or more antennas 158. The one or more memories 155 include computer program code 153 executed by the one or more processors 152. The one or more processors 152 may be implemented also as an integrated circuit or through other hardware such as a programmable gate array. The one or more memories 155 and the computer program code 153 are configured to cause, with the one or more processors 152, the CNC 170 to perform one or more of the operations as described herein. The one or more network interfaces 161 and 191 and/or the one or more transceivers 160 that have multi-connectivity configurations and communicate over the wireless network 100 or any other network. Such communication can be between the CNC 170, the ND 180, and the NN 110 via the links 176 and 111. In addition, two or more CNC 170 may communicate with another gNB or eNB using, e.g., links 176. The links 176 may be wired or wireless or both and may implement, e.g., an X2/Xn or N5 interface. Further the links 176 may be through other network devices such as, but not limited to an NCE/MME/SGW device such as the NCE/MME/SGW 190 of FIG. 2. The NCE/MME/SGW 190 can be associated with a AMF for operations such as providing UE-based authentication, authorization, mobility management, and/or a UPF for operations such as data transfer.

The ND 180 is a network device or a communication device or server which may be stand alone or embodied in another network such as which may be associated with a 5GS system, 5GS Node B, Node B, or an evolved NB. The ND 180 can communicate with devices such as but not limited to the CNC 170 and/or NN 110 and/or the wireless network 100 as in FIG. 2. This network can be considered an external network from a point of view of the ND 180 as an example. The ND 180 includes one or more processors 182, one or more memories 195, one or more network interfaces (N/W I/F(s)) 191, and one or more transceivers 190 interconnected through one or more buses 187. Each of the one or more transceivers 190 includes a receiver Rx 192 and a transmitter Tx 183. The one or more transceivers 190 are connected to one or more antennas 185. The one or more transceivers 190 have multi-connectivity configurations and communicate over the wireless network 100 or any other network. The one or more memories 195 include computer program code 193 executed by the one or more processors 182. The one or more processors 182 may be implemented also as an integrated circuit or through other hardware such as a programmable gate array. The one or more memories 155 and the computer program code 153 are configured to cause, with the one or more processors 182, the ND 180 to perform one or more of the operations as described herein. The one or more network interfaces 161 communicate over a network such as via the links 176. The CNC 170 and/or ND 180 may communicate with another network device such as a gNB and/or eNB and/or 5GS eNB or any other device using, e.g., links 176. The links 176 maybe wired or wireless or both and may implement, e.g., an X2/Xn or N5 interface. Further, as stated above the links 176 may be through other network devices such as, but not limited to an NCE/MME/SGW device such as the NCE/MME/SGW 190 of FIG. 2.

The one or more buses 157 and 187 may be address, data, or control buses, and may include any interconnection mechanism, such as a series of lines on a motherboard or integrated circuit, fiber optics or other optical communication equipment, wireless channels, and the like. For example, the one or more transceivers 160 and/or 190 may be implemented as a remote radio head (RRH) 203 and/or 205, with the other elements of the CNC 170 being physically in a different location from the RRH, and the one or more buses 157 could be implemented in part as fiber optic cable to connect the other elements of the CNC 170 to a RRH.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The CNC 170 is coupled via a link 131 to the NCE 190. The ND 180 is coupled via a link 200 to the NCE 190. Further, the ND 180 is coupled via links 176 to the CNC 170. The links 131, 176, and/or 200 may be implemented as, e.g., an Si interface.

The NCE 190 includes one or more processors 175, one or more memories 171, and one or more network interfaces (N/W I/F(s)) 197, interconnected through one or more buses coupled with the link 185. The one or more memories 171 include computer program code 173. The one or more memories 171 and the computer program code 173 are configured to, with the one or more processors 175, cause the NCE 190 to perform one or more operations which may be needed to support the operations in accordance with the example embodiments of the invention.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152, 182, or 175 and memories 155, 195, and 171, and also such virtualized entities create technical effects.

The computer readable memories 125, 155, 171, and 195 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 171, and 195 may be means for performing storage functions. The processors 125, 155, 171, and 195 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 175, and 182 may be means for performing functions, such as controlling the NN 110, CNC 170, ND 180, and other functions as described herein.

Example embodiments of the invention can work to represent the deterministic capabilities that a 5G System (5GS) can provide in a given communication scenario as a function of the characteristics of the associated deterministic data flow(s) to serve. Specifically, the characteristics would comprise at least the arrival time and/or periodic cycle of the data flow(s). As part of a management procedure, the 5GS represents and exposes its deterministic capabilities in terms of e.g., user-plane and/or control-plane delays, jitter, and reliability, as a function of such data flow parameters. This could be achieved for example as part of a negotiation with an Application Function (AF) over the N5 interface.

Further, it is noted that with regards to the embodiments and apparatus as described herein other "generic deterministic communication systems", e.g., DetNet, may also be applicable to perform the example embodiments of the invention as disclosed herein.

In accordance with an example embodiment of the invention, in a TSN scenario, the 5GS reports its capabilities (guaranteed latency, jitter, etc.) to a TSN CNC (or via distributed management entities), as a function of the time of arrival of the data to the 5GS.

As one example embodiment, the AF (e.g., TSN CNC) can make and/or adjust its scheduling decisions (e.g., in terms of data flow periodicity, transmit window timing, etc.) based on the reported information from the 5GS with the aim at optimizing the performance of the E2E data flow.

For Deterministic Networking, it can be assumed that the 5GS will have an absolute common time understanding shared with other network elements outside of the 5GS (and part of the TSN network). That is, means are available to communicating a time reference/offset between the 5GS and the external system to be served.

The following implementation options of this invention—rely on such time synchronization—and provide various examples of signalling schemes, that could be enabled for instance over the N5 interface or a different interface, for the 5GS to communicate its capabilities with the TSN network.

Simple Min-Max Signalling of 5GC Capabilities and Rules to AF/CNC
  Best-case minimum guaranteed latency given the deterministic flow follows certain rules (e.g., known deterministic traffic patterns)
    e.g., 0.25 ms in FIG. 1B;
  Worst-case minimum guaranteed latency given no control/knowledge over the deterministic flow's characteristics,
    E.g., 0.85 ms in FIG. 1B;
  Rules for achieving the best minimum guaranteed latency,
    E.g., payload/messages must come at an integer multiple of indices {0-19, 37-40} (communicated as absolute time-windows as all systems know the global time, e.g., absolute offset and then understanding the TDD index timing); and
    The resolution could even be given with higher resolution, e.g., ns, as external networks may have accurate control of its schedules.

5GS Latency Vs Payload Arrival Time Offset Signalling

The capabilities report could also be extended to not only include min-max delays, but also multiple values in between with their corresponding transmit window. For the example in FIG. 1B, the capabilities report could be:
  0.25 ms for messages coming at an integer multiple of indices {0-19, 37-40};
  0.5 ms for messages coming at an integer multiple of indices {29-35}; and
  0.85 ms for messages coming at an integer multiple of indices {20-28}.

Negotiation-Based Signaling

The reporting of capabilities could also be based on a multiple-step negotiation between the AF and the 5GS. For instance, in the initial step, the 5GS could simply report the latency interval that it can support, e.g., [0.15, 0.85] ms (see for example FIG. 1B).

Figure 3:
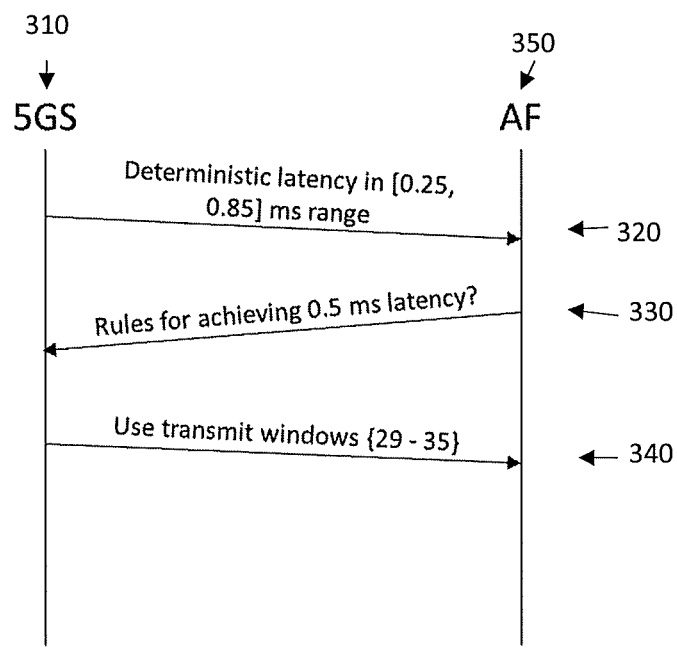
FIG. 3 shows an example signalling procedure between 5GS and AF/TSN CNC, for reporting a specific deterministic latency performance.

Based on this initial report, the AF could request more information on how to achieve a specific deterministic latency within the reported interval, as depicted in FIG. 3. Note that, as previously mentioned, transmit windows may be reported in terms of absolute time.

FIG. 3 shows an example signalling procedure between 5GS and AF/TSN CNC, for reporting a specific deterministic latency performance. As shown in FIG. 3 there is an indication from 5GS 310 to AF 350 of deterministic latency in the 0.25, 0.85 ms range 320; an indication from AF 350 to 5GS 310 negotiating for rules for achieving 0.5 ms latency 330; then a response from the 5GS 310 to the AF 350, the response to use transmit windows (29-35) 340 for achieving the desired latency. Such negotiation may also be initiated by the AF sending a request to the 5GS.

Traffic examples that can be supported by a TSN Ethernet Bridge and operated on in accordance with the embodiments are given below:
  In vertical use cases, traffic types exist that require—amongst other parameters like reliability—the message delivery with regards to a fixed deadline or latency, or exactly at a defined time with respect to a jitter and a global clock. The 5GS QoS framework must support the transport of traffic with such characteristics;
  The QoS functionality to support such messages is not agnostic of the message reception characteristic at the 5GS. For some applications, either a defined reception point in time or a known reception window may exist;
  In the strictest case where a message arrives at the 5GS guaranteed at a defined time instance and has to be delivered at another defined time instance, the relevant QoS parameter to support this message may be a fixed, exact delay value. Note this value can be split between UE (using a buffer) and the rest of the 5GS;
  In case the arrival time is only defined within a certain time window, but the message has to be delivered at a defined time instance, a fixed, exact delay value cannot capture the varying delay that has to be achieved in order to deliver the message correctly. The exact delay that has to be achieved by 5GS can only be calculated after the message has been received. Note that a minimum delay budget can be pre-calculated;
  In case the arrival time and the reception time both are defined within time windows, the 5GS can calculate the resulting delay budget window after the message reception and may use the delay budget window for e. g. diversity, possibly considering the multiplexing of several such message streams. Note an upper/lower delay budget window can be pre-calculated.

Thus, a (time) deterministic message transport can be characterized by the receive time and delivery time and the size of the message, while further QoS parameters can be derived from these values.

Examples of the derivation of relevant QoS parameters from the given values.
  The delay budget (window) may be calculated by:

Delay Budget=Delivery Time−Message Receive Time

A transmission slack may be calculated, such as with regards to the transmission rate and the size of the message (not considering retransmissions here):

Transmission Slack(Rate)=Delay Budget−Transmission Time=Delay Budget−(Message Size/Rate)

The transmission time value may consist of several factors, including retransmissions or minimum guaranteed rate.

Problem Statement #1

In order to support deterministic services and applications in Time
Synchronized Networking, 3GPP network needs to support capabilities that are expected by a TSN bridge:
  The TSN CNC expects detailed information on the capabilities of the underlying network including bridge latencies, before a path for a stream is set up by TSN; and
  TSN Bridge Delay managed object contains frame length-related attributes per tuple (ingress port, egress port, traffic class):
    independentDelay Min/Max—incurred bridge delay independent of the frame size; and
    dependentDelay Min/Max—incurred bridge delay per base volume (typically one octet/byte).

Thus, the above functionalities are expected to be provided by a "3GPP Bridge" as well:
  The 3GPP Bridge needs to expose the same set of parameters like regular Bridge towards CNC, particularly, "Bridge Delay" managed object, independentDelay Min/Max, dependentDelay Min/Max parameters.

Solution Proposal #1

3GPP network should support derivation of TSN Bridge Delay managed object attributes (independentDelayMin/Max and dependentDelayMin/Max) for a 3GPP Bridge based on 3GPP attributes, e.g., QoS flow packet delay budget (PDB) values, GFBR, and the MDBV indicated in the QoS profile; and Once the schedules for specific TSN streams are received by the CNC, the 3GPP Bridge needs to be able to enforce previously exposed QoS characteristics.

Problem Statement #2

In a wireless system, certain requirements e.g., latency, jitter and reliability, may only be met for certain traffic flow characteristics and specific configuration of the 5GS. For instance, in a TDD system, the delay experienced by each packet might depend on the direction of the wireless link (UL or DL) upon the arrival of the payload, or even on the time offset of the payload arrival with respect to the boundaries of OFDM symbols in the air interface (note that as similarly stated above the packets may be delivered to the 5GS at any time with ns resolution as it comes from high speed Ethernet system). Similar time dependencies may be also introduced by other features in the RAN as well as in the core.

In TSN, it is not possible to expose such time dependencies of the delay. Instead, the reported delay to the CNC is expected to be fixed and predictable, and depends at most on the data volume as previously described in problem statement #1.

Solution Options for #2

1. Do not consider time dependencies when exposing the capabilities to the CNC, and hence only report worst-case performance; and
2. Report the capabilities as a function of the characteristics of the data flows to serve. Such characteristics should include at least the arrival time of the messages, but could also be conditioned for a specific message size, message periodicity, among other. This requires that the CNC outside the 3GPP system is capable of understanding and making scheduling decisions based on the time-dependent capabilities exposed by the 5GS.

Problem Statement #3

A 3GPP Network needs to be able to deliver the capabilities expected by TSN systems (in terms of latency, time bound, and/or packet error rate). It is noted that the following requirements may have to be supported:

Enforcement of QoS requirements for deterministic services within a 3GPP network. TSN is one example of deterministic services;
QoS profile parameters needed for deterministic services, in general (with TSN as one example);
Means to identify TSN traffic;
Ability to properly handle TSN traffic e.g., scheduling, dropping of delayed packets; and
Latency budget monitoring.

Solution Options for #3

Following are the principles proposed:
Introduce new QoS resource type category in order to support applications requiring deterministic QoS. This helps differentiate the traffic and QoS characteristics (e.g., time bound, absolute time reference, low latency) needed for TSN type applications;

Introduce new 5QI for such traffic. This helps define appropriate standardized QoS characteristics (attributes and values) for such applications; and Introduce following QoS parameters as part of QoS profile in order to support TSN traffic,
Expected independentDelayMin/Max—indicating the latency induced by components such as processing time, etc., given the maximum expected packet (frame) size; and
Expected dependentDelayMin/Max—indicating the expected latency dependent on e.g., radio transmission, scheduling, retransmissions, queueing, given the maximum expected packet (frame) size.

Reference: IEEE P802.1Qcc "Standard for Local and Metropolitan Area Networks-Media Access Control (MAC) Bridges and Virtual Bridged Local Area Networks Amendment: Stream Reservation Protocol (SRP)"

This solution proposes enhancement needed to 5G System QoS Framework in order to support deterministic services that require guarantee packet delivery within a "bounded time window".

When deterministic services such as TSN is supported, Centralized Network Configuration (CNC), expects detailed information on the capabilities of the underlying network including bridge latencies as defined in IEEE P802.1Qcc [xx], before a path for a stream is set up by TSN:

TSN Bridge Delay managed object contains frame length-related attributes per tuple (ingress port, egress port, traffic class):
independentDelay Min/Max—incurred bridge delay independent of the frame size;
dependentDelay Min/Max—incurred bridge delay per base volume (typically one octet/byte).

Thus, the 3GPP network (when it acts as a bridge for the TSN system) needs to expose the same set of parameters like regular Bridge towards CNC, particularly, "Bridge Delay" managed object, independentDelay Min/Max, dependentDelay Min/Max parameters.

3GPP Network needs to be able to deliver the capabilities expected by TSN system. Following requirements have to be supported:

Enforcement of QoS requirements for deterministic services within a 3GPP network. TSN is one example of deterministic services;
QoS profile parameters needed for deterministic services, in general (with TSN as one example);
Means to identify TSN traffic;
Ability to properly handle TSN traffic e.g., scheduling, dropping of delayed packets; and
Latency budget monitoring.

Besides, wireless systems face additional challenges to achieve strict requirements of latency, jitter and reliability, as compared to Ethernet-based wired networks. For instance, in a TDD system, the delay experienced by each packet might depend on the direction of the wireless link (UL or DL) upon the arrival of the payload, or even on the time offset of the payload arrival with respect to the boundaries of OFDM symbols in the air interface (note that the packets may be delivered to the 5GS at any time with ns resolution as it comes from high speed Ethernet system). Further, as per problem statement #2 similar time dependencies may be also introduced by other features in the RAN as well as in the core. As reported in problem statement #2, in TSN, the reported delay to the CNC is expected to be fixed and predictable, and only depends on the data volume as previously mentioned. Exposing the 3GPP bridge's capabilities as a function of certain characteristics of the data flows to serve may be of benefit.

High Level Description

This solution has the following two main components:
1) Exposure of 3GPP Network capabilities to applications requiring deterministic services (e.g., TSN bridge, specifically TSN CNC); and
2) Support the capabilities essential for deterministic services (i.e. QoS characteristics that are needed for applications including TSN).

Exposure of 3GPP Network Capabilities

Following principles are proposed:

3GPP network should support derivation of TSN Bridge Delay managed object attributes (independentDelayMin/Max and dependentDelayMin/Max) for a 3GPP Bridge based on 3GPP attributes, e.g., QoS flow packet delay budget (PDB) values, GFBR, and the MDBV indicated in the QoS profile. Mapping of 3GPP attributes to TSN capabilities could happen in the SMF or PCF and the exposure of capabilities towards TSN Bridge can happen via NEF (if it is an untrusted AF) or SMF/PCF (in case of trusted AF).

Once the schedules for specific TSN streams are received by the CNC and the session is established, the 3GPP Bridge needs to be able to deliver previously exposed QoS characteristics To overcome the time dependencies of the wireless network, it may be beneficial to expose the 3GPP bridge's capabilities as a function of the characteristics of the data flows to serve. Such characteristics should include at least the arrival time of the messages, but could also be conditioned on the message size, message periodicity, among other parameters. This requires that the CNC outside the 3GPP system is capable of understanding and making scheduling decisions based on the time-dependent capabilities exposed by the 5GS. Another option is to not consider time dependencies when exposing the capabilities to the CNC, and hence only report worst-case performance.

Figure 4:
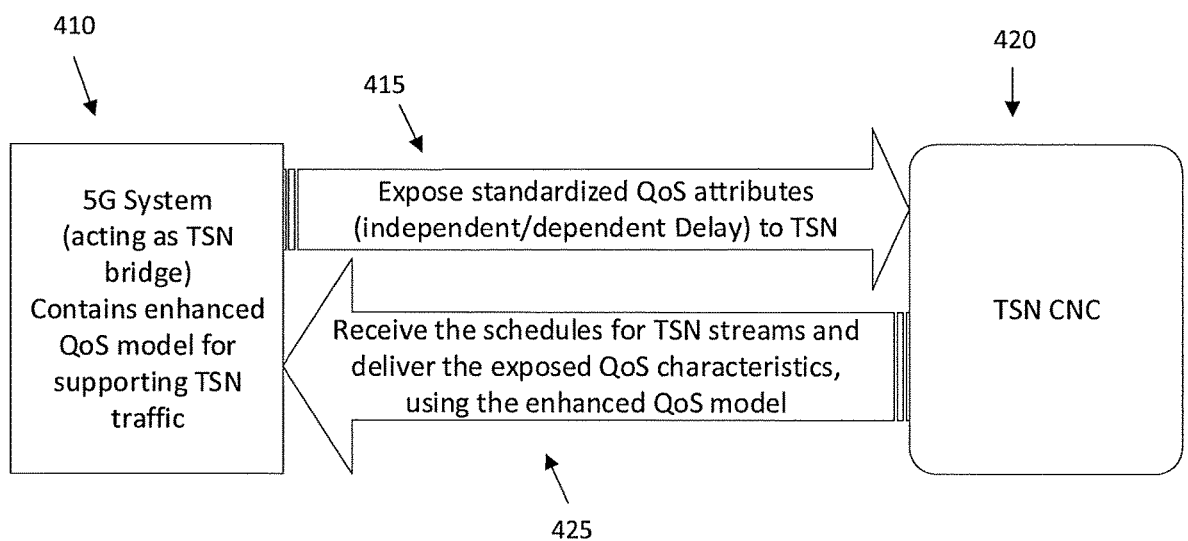
FIG. 4 shows communications in accordance with example embodiments of the invention involving exposed QoS characteristics between a 5G system and a TSN CNC.

FIG. 4 shows communications in accordance with example embodiments of the invention involving exposed QoS characteristics between a 5G system and a TSN CNC. As shown in FIG. 4 there is a 5G system (5GS) 410, which may be acting as a TSN bridge that contains enhanced QoS model for supporting TSN traffic. As shown in FIG. 4 the 5G system 410 is an indication to expose standardized QoS attributes 415 to TSN CNC 420. These attributes 415 can identify an independent/dependent delay associated with the QoS attributes. As shown in FIG. 4 the TSN CNC 420 is receiving by the 5G system 410 from the TSN CNC 420 in indication 425 the schedule for TSN streams and the exposed QoS characteristics, using an enhanced QoS model.

Example embodiments of the invention as described herein at least address issues of a case where a TSN system involves a scenario which requires deterministic assigned time synchronization and timeliness for network communication.

In accordance with an example embodiments of the invention a 5GS would report its capabilities (guaranteed latency, jitter, etc.), as a function of the time of arrival of the data to the 5GS. Further, it is noted that TSN is only an example. Other "generic deterministic communication systems", e.g., DetNet, may also be applicable.

Figure 5A:
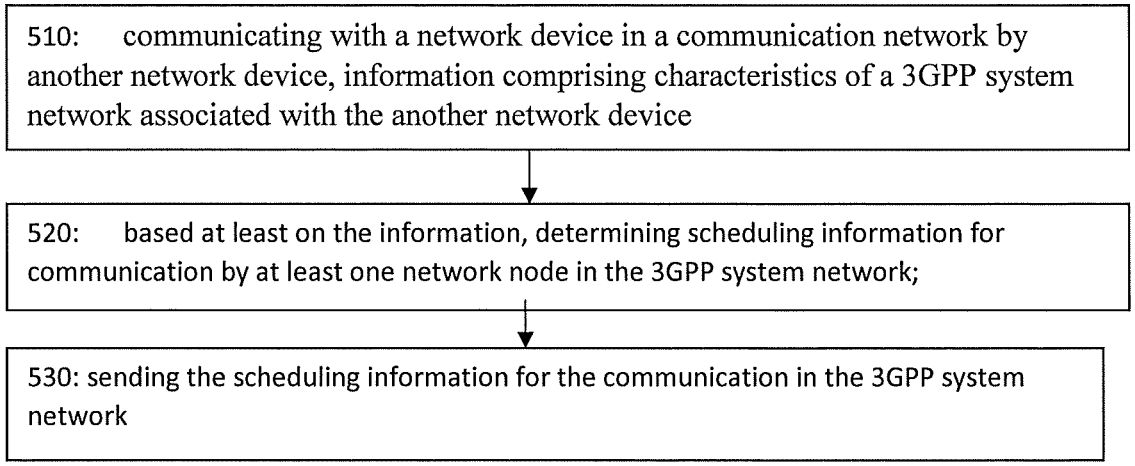
FIGS. 5A and 5B each show a method which may be performed by an apparatus in accordance with the example embodiments of the invention.

FIG. 5A illustrates operations which may be performed by a network device such as, but not limited to, an application function device such as the CNC 170 as in FIG. 2 which may be incorporated into another device as indicated in the description of FIG. 2 above. As shown in step 510 of FIG. 5A there is communicating with a network device in a communication network by another network device, information comprising characteristics of a 3GPP system network associated with the another network device; as shown in step 520 of FIG. 5A there is based at least on the information, determining scheduling information for communication by at least one network node in the 3GPP system network; then as shown in step 530 of FIG. 5A there is sending the scheduling information for the communication in the 3GPP system network.

In accordance with the example embodiments as described in the paragraph above, wherein the 3GPP system network comprises a 5GS network, and wherein the another network device comprises a 5GS server.

In accordance with the example embodiments as described in the paragraphs above, wherein the characteristics are communicated as a function of application data generated/received by the another network device.

In accordance with the example embodiments as described in the paragraphs above, wherein the another network device comprises a 3GPP time sensitive networking bridge.

In accordance with the example embodiments as described in the paragraphs above, wherein the communicating comprises communicating between the 3GPP time sensitive networking bridge and the 3GPP 5GS network a function of characteristics of data flows to serve for the communication.

In accordance with the example embodiments as described in the paragraphs above, wherein the information comprise data flow parameters including an arrival time and a periodic cycle of data flows associated with the 3GPP 5GS network.

In accordance with the example embodiments as described in the paragraphs above, wherein the communicating comprises communicating between the 3GPP 5GS network and the 3GPP time sensitive networking bridge deterministic capabilities in terms of e.g., user-plane and/or control-plane delays, jitter, and reliability, as a function of the data flow parameters.

In accordance with the example embodiments as described in the paragraphs above, wherein the communicating causes the 3GPP time sensitive networking bridge to makes or adjust scheduling decisions, in terms of at least a data flow periodicity, and transmit window timing, based on the information from the 3GPP 5GS network in order to optimize performance of at least one E2E data flow of the communication.

In accordance with the example embodiments as described in the paragraphs above, wherein the communicating is performed over an N5 interface.

In accordance with the example embodiments as described in the paragraphs above, wherein the characteristics are based on specific windows of time, wherein the specific windows of time are based on at least one of data flow periodicity, transmit widow timing, cycles of transmit window timing.

In accordance with the example embodiments as described in the paragraphs above, wherein the characteristics comprise indications of at least one of an availability of guaranteed latency, a minimum guaranteed latency, and a maximum guaranteed latency of communications in the 5GS network for at least one interval of time.

In accordance with the example embodiments as described in the paragraphs above, there is, based on the characteristics, at least one of determining and adjusting the scheduling scheduling information to at least optimize performance of data flow for the communication.

In accordance with the example embodiments as described in the paragraphs above, wherein the indications are for different time periods within the at least one interval of time.

In accordance with the example embodiments as described in the paragraphs above, wherein the communicating comprises communications to determine, based on the characteristics for the at least one interval of time, how to achieve a specific deterministic latency during the at least one interval of time.

In accordance with the example embodiments as described in the paragraphs above, wherein the communications to determine how to achieve a specific deterministic latency for the communication during the at least one interval of time, comprises communications to determine how to achieve a specific deterministic latency during a time period within the at least one interval of time.

In accordance with the example embodiments as described in the paragraphs above, wherein the communicating comprises communication rules for achieving a best minimum guaranteed latency for the at least one interval of time.

In accordance with the example embodiments as described in the paragraphs above, wherein the rules for achieving the best minimum guaranteed latency comprises a time variance expected for the at least one interval of time.

In accordance with the example embodiments as described in the paragraphs above, wherein the rules for achieving the best minimum guaranteed latency comprises an indication of at least one integer range of indices of a payload for the communication during the at least one interval of time.

In accordance with the example embodiments as described in the paragraphs above, wherein the characteristics are based on the at least one integer range of indices.

A non-transitory computer-readable medium (Memory(ies) 155 of FIG. 2) storing program code (Computer Program Code 153 of FIG. 2), the program code executed by at least one processor (Processor(s) 152 of FIG. 2) to perform the operations as at least described in the paragraphs above.

In accordance with an example embodiment of the invention as described above there is an apparatus comprising: means for communicating (link 176 and/or N/W I/F(s) 161 as in FIG. 2) with another network device (ND 180 as in FIG. 2) in a communication network (network 100 as in FIG. 2) by a network device (CNC 170 as in FIG. 2) information comprising characteristics of a 3GPP system network associated with the another network device; means, based at least on the information, for determining (Memory(ies) 155, Computer Program Code 153, Processor(s) 152, and link 176 and/or N/W I/F(s) 161 of FIG. 2) scheduling information for communication by at least one network node (e.g., NN 110 as in FIG. 2) in the 3GPP system network; and means for sending (Memory(ies) 155, Computer Program Code 153, Processor(s) 152, and link 176 and/or N/W I/F(s) 161 of FIG. 2) the scheduling information for the communication in the 3GPP system network.

In the example aspect of the invention according to the paragraph above, wherein at least the means for communicating, determining, and sending comprises a non-transitory computer readable medium [Memory(ies) 155 as in FIG. 2] encoded with a computer program [,Computer Program Code 153 as in FIG. 2] executable by at least one processor [Processor(s) 152] as in FIG. 2].

Figure 5B:
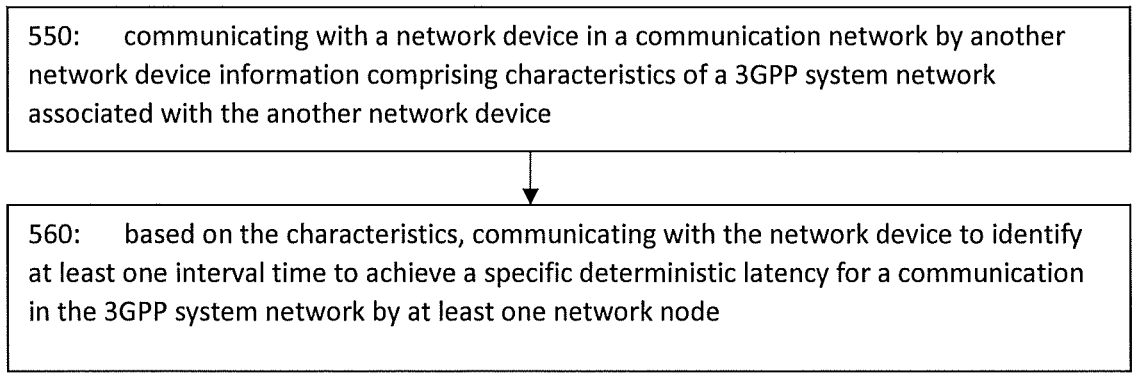

FIG. 5B illustrates operations which may be performed by a network node such as, but not limited to, a network device such as the ND 180 as in FIG. 2 or an application function device which may be incorporated into another device as indicated in the description of FIG. 2 above. As shown in step 550 of FIG. 5B there is communicating with a network device in a communication network by another network device information comprising characteristics of an 3GPP system network associated with the another network device; as shown in step 560 of FIG. 5B there is based on the characteristics, communicating with the network device to identify at least one interval of time to achieve a specific deterministic latency for a communication in the 3GPP system network by at least one network node.

In accordance with the example embodiments as described in the paragraph above, wherein the 3GPP system network comprises a 5GS network, and wherein the network device comprises an application function server.

In accordance with the example embodiments as described in the paragraphs above, wherein the network device comprises a 3GPP 5GS network device wherein the another network device comprises a 3GPP time sensitive networking bridge.

In accordance with the example embodiments as described in the paragraphs above, wherein the communicating comprises communicating between the 3GPP time sensitive networking bridge and the 3GPP 5GS network device a function of characteristics of data flows to serve for the communication.

In accordance with the example embodiments as described in the paragraphs above, wherein the information comprise data flow parameters including an arrival time and a periodic cycle of data flows associated with the 3GPP 5GS network device.

In accordance with the example embodiments as described in the paragraphs above, wherein the communicating comprises communicating between the 3GPP 5GS network device and the 3GPP time sensitive networking bridge deterministic capabilities in terms of e.g., user-plane and/or control-plane delays, jitter, and reliability, as a function of the data flow parameters.

In accordance with the example embodiments as described in the paragraphs above, wherein the communicating causes the 3GPP time sensitive networking bridge to makes or adjust scheduling decisions, in terms of at least a data flow periodicity, and transmit window timing, based on the information from the 3GPP 5GS network device in order to optimize performance of at least one E2E data flow of the communication.

In accordance with the example embodiments as described in the paragraphs above, wherein the communicating is performed over an N5 interface.

In accordance with the example embodiments as described in the paragraphs above, wherein the characteristics are based on specific windows of time, wherein the specific windows of time are based on at least one of data flow periodicity, transmit widow timing, cycles of transmit window timing.

In accordance with the example embodiments as described in the paragraphs above, wherein the characteristics comprise indications of at least one of an availability of guaranteed latency, a minimum guaranteed latency, and a maximum guaranteed latency of communications in the 5GS network for at least one interval of time.

In accordance with the example embodiments as described in the paragraphs above, there is, based on the characteristics, at least one of determining and adjusting the scheduling scheduling information to at least optimize performance of data flow for the communication.

In accordance with the example embodiments as described in the paragraphs above, wherein the indications are for different time periods within the at least one interval of time.

In accordance with the example embodiments as described in the paragraphs above, wherein the communicating comprises communications to determine, based on the characteristics for the at least one interval of time, how to achieve a specific deterministic latency during the at least one interval of time.

In accordance with the example embodiments as described in the paragraphs above, wherein the communications to determine how to achieve a specific deterministic latency for the communication during the at least one interval of time, comprises communications to determine how to achieve a specific deterministic latency during a time period within the at least one interval of time.

In accordance with the example embodiments as described in the paragraphs above, wherein the communicating comprises communication rules for achieving a best minimum guaranteed latency for the at least one interval of time.

In accordance with the example embodiments as described in the paragraphs above, wherein the rules for achieving the best minimum guaranteed latency comprises a time variance expected for the at least one interval of time.

In accordance with the example embodiments as described in the paragraphs above, wherein the rules for achieving the best minimum guaranteed latency comprises an indication of at least one integer range of indices of a payload for the communication during the at least one interval of time.

In accordance with the example embodiments as described in the paragraphs above, wherein the characteristics are based on the at least one integer range of indices.

A non-transitory computer-readable medium (Memory(ies) 195 of FIG. 2) storing program code (Computer Program Code 193 of FIG. 2), the program code executed by at least one processor (Processor(s) 182 of FIG. 2) to perform the operations as at least described in the paragraphs above.

In accordance with an example embodiment of the invention as described above there is an apparatus comprising: means for communicating (Memory(ies) 195, Computer Program Code 193, Processor(s) 182, and link 176 and/or N/W I/F(s) 191 as in FIG. 2) with a network device (CNC 170 as in FIG. 2) in a communication network (network 100 as in FIG. 2) by another network device (ND 180 as in FIG. 2) information comprising characteristics of a 3GPP system network associated with the another network device (ND 180 as in FIG. 2); and means, based on the characteristics, for communicating (Memory(ies) 195, Computer Program Code 193, Processor(s) 182, and link 176 and/or N/W I/F(s) 191 as in FIG. 2) with the network device (CNC 170 as in FIG. 2) to identify (Memory(ies) 195, Computer Program Code 193, and Processor(s) 182) at least one interval of time to achieve a specific deterministic latency for a communication in the 3GPP system network by at least one network node (e.g., NN 110 as in FIG. 2) associated with the network device.

In the example aspect of the invention according to the paragraph above, wherein at least the means for communicating and identifying comprises a non-transitory computer readable medium [Memory(ies) 195 as in FIG. 2] encoded with a computer program [,Computer Program Code 193 as in FIG. 2] executable by at least one processor [Processor(s) 182] as in FIG. 2].

Advantages of operations in accordance with the example embodiments as described herein include at least that by reporting the 5GS time dependence of delay to a control system that manages the TSN or any generic deterministic communication system, it is feasible to set up deterministic latency flows requiring close to the best-case performance of the 5GS. This will increase the number of use-cases that can be supported by the 5G wireless system.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
communicating information between a network device in a communication network and another network device, the information comprising characteristics of an 3GPP system network associated with the another network device; and
based on the characteristics, communicating with the network device to identify at least one interval of time to achieve a specific deterministic latency for a communication in the 3GPP system network with at least one network node,
wherein the information comprises data flow parameters including an arrival time and a periodic cycle of data flows associated with the 3GPP system network.

2. The method of claim 1, wherein the 3GPP system network comprises a 5GS network, and wherein the network device comprises an application function server.

3. The method of claim 1, wherein the communicating with the network device in the communication network with the another network device comprises communicating between the network device and the another network device deterministic capabilities in terms of at least one of user-plan, control-plane delays, jitter, or reliability, as a function of the data flow parameters.

4. The method of claim 1, wherein the communicating with the network device in the communication network with the another network device causes the 3GPP system network to make or adjust scheduling decisions, in terms of at least a data flow periodicity, and transmit window timing, based on the information communicated between the network device and the another network device in order to optimize performance of at least one E2E data flow of the communication.

5. The method of claim 1, wherein the communicating with the network device in the communication network with the another network device is performed over an N5 interface.

6. The method of claim 1, wherein the characteristics are based on specific windows of time, wherein the specific windows of time are based on at least one of data flow periodicity, transmit widow timing, or cycles of transmit window timing.

7. The method of claim 1, wherein the characteristics comprise indications of at least one of an availability of guaranteed latency, a minimum guaranteed latency, or a maximum guaranteed latency of communications in the 3GPP system network for at least one interval of time.

8. The method of claim 1, comprising:
based on the characteristics, at least one of determining or adjusting scheduling information to at least optimize performance of data flow for the communication.

9. The method of claim 7, wherein the indications are for different time periods within the at least one interval of time.

10. An apparatus, comprising:
circuitry configured to communicate information with a network device in a communication network, the information comprising characteristics of an 3GPP system network associated with the apparatus; and
circuitry configured to communicate, based on the characteristics, with the network device to identify at least one interval of time to achieve a specific deterministic latency for a communication in the 3GPP system network with at least one network node,
wherein the information comprises data flow parameters including an arrival time and a periodic cycle of data flows associated with the 3GPP system network.

11. The apparatus of claim 10, wherein the 3GPP system network comprises a 5GS network, and wherein the network device comprises an application function server.

12. The apparatus of claim 10, wherein the circuitry configured to communicate with the network device in the communication network is further configured to communicate between the network device and the apparatus deterministic capabilities in terms of, at least one of user-plane, control-plane delays, jitter, or reliability, as a function of the data flow parameters.

13. The apparatus of claim 12, wherein the communicating with the network device in the communication network causes the 3GPP system network to make or adjust scheduling decisions, in terms of at least a data flow periodicity, and transmit window timing, based on the information communicated between the network device and the apparatus in order to optimize performance of at least one E2E data flow of the communication.

14. The apparatus of claim 10, wherein the circuitry configured to communicate with the network device in the communication network is further configured to perform the communicating over an N5 interface.

15. The apparatus of claim 10, wherein the characteristics are based on specific windows of time, wherein the specific windows of time are based on at least one of data flow periodicity, transmit widow timing, or cycles of transmit window timing.

16. The apparatus of claim 10, wherein the characteristics comprise indications of at least one of an availability of guaranteed latency, a minimum guaranteed latency, or a maximum guaranteed latency of communications in the 5GS network for at least one interval of time.

17. The apparatus of claim 16, comprising:
circuitry configured for at least one of, based on the characteristics, determining or adjusting scheduling information to at least optimize performance of data flow for the communication.

18. The apparatus of claim 16, wherein the indications are for different time periods within the at least one interval of time.

* * * * *